United States Patent
Furukawa (10) Patent No.: US 7,430,069 B2
(45) Date of Patent: Sep. 30, 2008

(54) METHOD OF CONVERTING IMAGE DATA, IMAGE DATA CONVERSION APPARATUS AND PROGRAM

(75) Inventor: Itaru Furukawa, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 179 days.

(21) Appl. No.: 11/404,886

(22) Filed: Apr. 17, 2006

(65) Prior Publication Data

US 2006/0232804 A1 Oct. 19, 2006

(30) Foreign Application Priority Data

Apr. 18, 2005 (JP) ............... 2005-119719

(51) Int. Cl.
*G03F 3/08* (2006.01)

(52) U.S. Cl. ...................... 358/518; 358/1.9

(58) Field of Classification Search ............ 358/1.9, 358/519, 2.1, 518; 347/43, 254
See application file for complete search history.

(56) References Cited

U.S. PATENT DOCUMENTS

| | | | | |
|---|---|---|---|---|
| 2003/0043393 A1* | 3/2003 | Iwasaki | ............ | 358/1.9 |
| 2004/0051887 A1* | 3/2004 | Nishide et al. | ........ | 358/1.9 |
| 2005/0068585 A1* | 3/2005 | Shimizu | ........ | 358/2.1 |
| 2005/0134881 A1* | 6/2005 | Nishide et al. | ........ | 358/1.9 |
| 2005/0179727 A1* | 8/2005 | Bestmann | ........ | 347/43 |
| 2005/0212907 A1* | 9/2005 | Teraue | ........ | 347/254 |

FOREIGN PATENT DOCUMENTS

| | | |
|---|---|---|
| JP | 10-248017 | 9/1998 |
| JP | 2001-157074 | 6/2001 |
| JP | 2003-078778 | 3/2003 |
| JP | 2003-248366 | 12/2003 |

\* cited by examiner

*Primary Examiner*—Twyler L. Haskins
*Assistant Examiner*—Nicholas C Pachol
(74) *Attorney, Agent, or Firm*—McDermott Will & Emery LLP (57) ABSTRACT

A conversion computation section acquires the original color density value of a single process color in a given image region and the original color density value of a spot color from raster data, and acquires a pseudocolor conversion rate for conversion from the spot color to the process color from spot color information. Then, the conversion computation section calculates a proof color density value $H_i$ of each process color on a pixel-by-pixel basis in each image region by using a conversion computation expressed by $H_i = P_i + s \cdot G_i - P_i \cdot s \cdot G_i$ where $P_i$ (i=C, M, Y or K) is the original color density value of the single process color, s is the original color density value of the spot color, and $G_i$ is the pseudocolor conversion rate for conversion from the spot color to the process color. The proof color density value reflects a change in gradation of the process color and a change in gradation of the spot color without the saturation of the color density.

4 Claims, 9 Drawing Sheets

| REGION | AREA PROPORTION (X) | CONTRIBUTORY COLOR DENSITY VALUE (Y) | XY |
|---|---|---|---|
| A | $P_i \cdot s$ | 1 | $P_i \cdot s$ |
| B | $(1-P_i) \cdot s$ | $G_i$ | $(1-P_i) \cdot s \cdot G_i$ |
| C | $P_i \cdot (1-s)$ | 1 | $P_i \cdot (1-s)$ |
| D | $(1-P_i) \cdot (1-s)$ | 0 | 0 |

$$\Sigma XY = P_i + (1-P_i) \cdot s \cdot G_i$$

F I G . 6

F I G. 7

| REGION | AREA PROPORTION (X) | CONTRIBUTORY COLOR DENSITY VALUE (Y) | XY |
|---|---|---|---|
| E | $s1 \cdot s2$ | $G12_i$ | $s1 \cdot s2 \cdot G12_i$ |
| F | $(1-s1) \cdot s2$ | $G2_i$ | $(1-s1) \cdot s2 \cdot G2_i$ |
| G | $s1 \cdot (1-s2)$ | $G1_i$ | $s1 \cdot (1-s2) \cdot G1_i$ |
| H | $(1-s1) \cdot (1-s2)$ | 0 | 0 |

$$\Sigma XY = s1 \cdot G1_i + (1-s1 \cdot G1_i) \cdot s2 \cdot G2_i \quad (\text{WHERE } G12_i = G1_i + (1-G1_i) \cdot G2_i)$$

|  | ORIGINAL COLOR DENSITY VALUE | | | | |
|---|---|---|---|---|---|
|  | C | M | Y | K | s1 |
|  | $P_C$ | $P_M$ | $P_Y$ | $P_K$ | s |
| Pc REGION | 0.70 | 0 | 0 | 0.03 | 0 |
| Pm REGION | 0 | 0.82 | 0 | 0.03 | 0 |
| Py REGION | 0 | 0 | 0.90 | 0.03 | 0 |
| S1 REGION | 0 | 0 | 0 | 0 | 0.80 |
| Pc-S1 REGION | 0 | 0 | 0 | 0 | 0.80 |
| Pm-S1 REGION | 0.70 | 0 | 0 | 0.03 | 0 |

F I G . 1 0

| PSEUDOCOLOR CONVERSION RATE | | | |
|---|---|---|---|
| C | M | Y | K |
| $G_C$ | $G_M$ | $G_Y$ | $G_K$ |
| 0.25 | 0.35 | 0.45 | 0.05 |

F I G . 1 1

| PSEUDOCOLOR DENSITY VALUE | | | |
|---|---|---|---|
| C | M | Y | K |
| $s \cdot G_C$ | $s \cdot G_M$ | $s \cdot G_Y$ | $s \cdot G_K$ |
| 0.20 | 0.28 | 0.36 | 0.04 |

F I G . 1 2

| | PROOF COLOR DENSITY VALUE | | | |
|---|---|---|---|---|
| | C | M | Y | K |
| | $H_C$ | $H_M$ | $H_Y$ | $H_K$ |
| Pc-S1 REGION | 0.76 | 0.28 | 0.36 | 0.07 |
| Pm-S1 REGION | 0.20 | 0.87 | 0.36 | 0.07 |

FIG. 13

|  | Add COMBINATION ||||
|---|---|---|---|---|
|  | C | M | Y | K |
| Pc-S1 REGION | 0.90 | 0.28 | 0.36 | 0.07 |
| Pm-S1 REGION | 0.20 | 1.10 | 0.36 | 0.07 |

FIG. 14

|  | MAX COMBINATION ||||
|---|---|---|---|---|
|  | C | M | Y | K |
| Pc-S1 REGION | 0.70 | 0.28 | 0.36 | 0.04 |
| Pm-S1 REGION | 0.20 | 0.82 | 0.36 | 0.04 |

METHOD OF CONVERTING IMAGE DATA, IMAGE DATA CONVERSION APPARATUS AND PROGRAM

BACKGROUND OF THE INVENTION

1. Field of the Invention

The present invention relates to a technique for converting a color representation used in spot color printing into a color representation which does not include the spot color. More particularly, the invention relates to a technique for appropriately determining color density values when colors are overprinted.

2. Description of the Background Art

A large number of color printed materials are created by the use of plates (or process plates) prepared for respective basic colors known as process colors (typically the following four colors: C (cyan); M (magenta); Y (yellow); and K (black)) (or by the use of data about color density values corresponding to the plates for the respective color components in plateless printing). When there is a need for printing using a color which cannot be sufficiently represented by the process plates or a color which is not permitted to vary, it is customary to prepare a special ink of a color known as a "spot color" and to do printing using an additional plate specific to spot color printing for the purpose of accurately representing the required color. In such a case, it is needless to say that an output apparatus is capable of the spot color printing.

For creation of printed materials, proof output is typically produced for the purpose of color proof and the like prior to final output. Alternatively, a simulation can be performed on the color representation for spot color printing in a layout step. For the output (referred to hereinafter as "proof output" including the latter unless otherwise specified) intended for such purposes, only a small number of copies is required to be outputted, and it is a common practice to use an output apparatus (also referred to as a "proofer" when used in the proof output) different from that for final output which is assumed to output a large number of copies. However, many output apparatuses of such a type are not capable of producing output including the spot color, but are capable of producing only output using the process plates. Thus, such output apparatuses, when used for the proof output of printed materials including the spot color, cannot produce the output for a spot color image and finally cannot produce the output which meets the purpose of checking the color representation and the like. To attain the output including the spot color in a pseudo manner even in such output apparatuses, it has been a customary practice to perform the process of converting the color density value (or the dot percentage) of the spot color into the color density values of the respective process colors before producing the output. The process of converting the color density value of the spot color into the color density values of the respective process colors in this manner is also referred to as "pseudocolorization." Various techniques for such a color conversion process are known in the art (as disclosed, for example, in Japanese Patent Application Laid-Open No. 2001-157074, Japanese Patent Application Laid-Open No. 2003-78778, and Japanese Patent Application Laid-Open No. 10-248017 (1998)).

When color designation is determined so that there is no overlap between the ink of the spot color and the ink of other colors for the creation of a printed material by the use of the spot color, printing for the spot color plate is substantially the same as single-color printing. In this case, the use of the color density values of the respective process colors obtained by the pseudocolorization in a portion where the spot color is designated for the proof output after the pseudocolorization will achieve the output using only the process colors which represent the spot color as faithfully as possible.

On the other hand, when color designation is determined so that the spot color and other colors are overprinted, the proof output involving the pseudocolorization necessitates the representation of the overprint using only the process colors. Each of the color density values for the proof output is obtained by combining the color density value of a process color which is obtained by the pseudocolorization (and which should represent the spot color as in a pseudo manner as possible) with the color density value (for final output) originally designated for the process color by using an appropriate method. The color density values obtained by the combination are required to represent the overprint as faithfully as possible.

Japanese Patent Application Laid-Open No. 2001-157074, Japanese Patent Application Laid-Open No. 2003-78778 and Japanese Patent Application Laid-Open No. 10-248017 (1998) disclose a common technique in providing a color density value (referred to hereinafter as a "pseudocolor density value") of each process color obtained by the pseudocolorization (or in a color space for the proofer) for a spot color for use in printing by various methods to combine the pseudocolor density value with a color density value (referred to hereinafter as an "original color density value") for final output which is provided for each process color by a predetermined method, thereby providing a color density value (referred to hereinafter as a "proof color density value") of each process color for use in proof output.

A relatively simple form of such combination is a method (refereed to hereinafter as an "Add combination method") of simply determining the sum of the pseudocolor density value and the original color density value as the proof color density value for each color component. Japanese Patent Application Laid-Open No. 2001-157074 illustrates the application of the Add combination method in an RGB color space and L*a*b* space. When this process is performed in a CMYK color space generally used for printing, there can be cases where the sum calculated percentagewise exceeds 100%. However, the color density is saturated at 100% in the actual printing. Therefore, this method is not capable of representation of gradation which reflects the overprint.

Another conceivable method that is similarly simple is a method (referred to hereinafter as a "MAX combination method") of making a comparison between the pseudocolor density value and the original color density value per pixel for each process color component to adopt the greater value as the proof color density value. Japanese Patent Application Laid-Open No. 2003-78778 discloses the process of generating pieces of halftone data about a process color and a spot color and then setting post-combination halftone data at "1" for a region in which one of the pieces of halftone data is "1." This process is substantially equivalent to the MAX combination method. In the MAX combination method, the color density values do not exceed 100%. Additionally, a proof color density value similar to that obtained by the Add combination method is obtained for a region in which at least one of the color density values equals zero, but the smaller one of the color density values is different from the original output for a region in which neither of the color density values equals zero. This presents the problem that the overprint cannot be said to be faithfully represented.

Japanese Patent Application Laid-Open No. 10-248017 (1998) illustrates a technique such that, when neither the pseudocolor density value nor the original color density value equals zero, the order of overprinting is considered and the color density value for an image forming the top layer is adopted (although the color density values are represented as vectors). This technique, however, is similar to the MAX combination method in that the overprint cannot be said to be faithfully represented because the remaining density value is neglected.

SUMMARY OF THE INVENTION

The present invention is intended for a data conversion method and a data conversion apparatus for converting a color representation used in spot color printing into a color representation not including the spot color, and for appropriately determining color density values when colors are overprinted.

A first aspect of the present invention is directed to a method of converting first image data into second image data by using a predetermined conversion element provided in a predetermined image data processing apparatus, the first image data having a plurality of first color components, the plurality of first color components being a spot color and at least one process color, the second image data having a plurality of second color components, each of the plurality of second color components being a process color. The method comprises the steps of: a) acquiring a plurality of first color density values for the plurality of first color components from the first image data; b) reading conversion information from a predetermined storage element, the conversion information including a plurality of conversion factors for obtaining a pseudocolor density value for the spot color; and c) converting the first image data into the second image data, the conversion in the step c) being performed by calculating a plurality of second color density values for the plurality of second color components based on the plurality of first color density values and the plurality of conversion factors, wherein a second color density value $H_i$ for a given color component i included among the plurality of second color density values is calculated by $$H_i = P_i + s \cdot G_i - P_i \cdot s \cdot G_i$$

where the given color component i is one of the plurality of second color components, $P_i$ is a first color density value for the given color component i included among the plurality of first color density values, $G_i$ is a conversion factor for the given color component i included among the plurality of conversion factors, s is a first color density value for the spot color included among the plurality of first color density values, and each of the color density values is defined that a maximum value is "1".

A second aspect of the present invention is directed to a method of converting first image data into second image data by using a predetermined conversion element provided in a predetermined image data processing apparatus, the first image data having a plurality of first color components, the plurality of first color components including two spot colors, the second image data having a plurality of second color components, each of the plurality of second color components being a process color. The method comprises the steps of: a) acquiring a plurality of first color density values for the plurality of first color components from the first image data; b) reading conversion information from a predetermined storage element, the conversion information including a plurality of conversion factors for obtaining a pseudocolor density value for each of the two spot colors; and c) converting the first image data into the second image data, the conversion in the step c) being performed by calculating a plurality of second color density values for the plurality of second color components based on the plurality of first color density values and the plurality of conversion factors, wherein a second color density value for a given color component included among the plurality of second color density values is calculated by subtracting the product of two pseudocolor density values for the given color component from the sum of the two pseudocolor density values, the two pseudocolor density values being obtained in corresponding relation to the two spot colors, each of the color density values being defined that a maximum value is "1", the two pseudocolor density values for the given color component being calculated by multiplying a first color density value for the given color component included among the plurality of first color density values by a conversion factor for the given color component included among the plurality of conversion factors.

According to the present invention, when the first image data represented by colors including a spot color is converted into the second image data represented only by process colors, the second image data obtained by the conversion reflects both a change in gradation of the process colors and a change in gradation of the spot color without the saturation of the color densities even if overprinting occurs in the first image data. Thus, when the generation of the proof image data from the raster data involves pseudocolorization, the present invention achieves the generation of the image data having a color representation more appropriate than that obtained by a conventional method.

It is therefore an object of the present invention to provide an apparatus for and method of converting first printing image data having a color representation including a spot color into second printing image data having a color representation not including the spot color, the apparatus and method being capable of appropriately providing color density values representing overprinted colors in the second printing image data.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

<Apparatus Construction>

Figure 1:
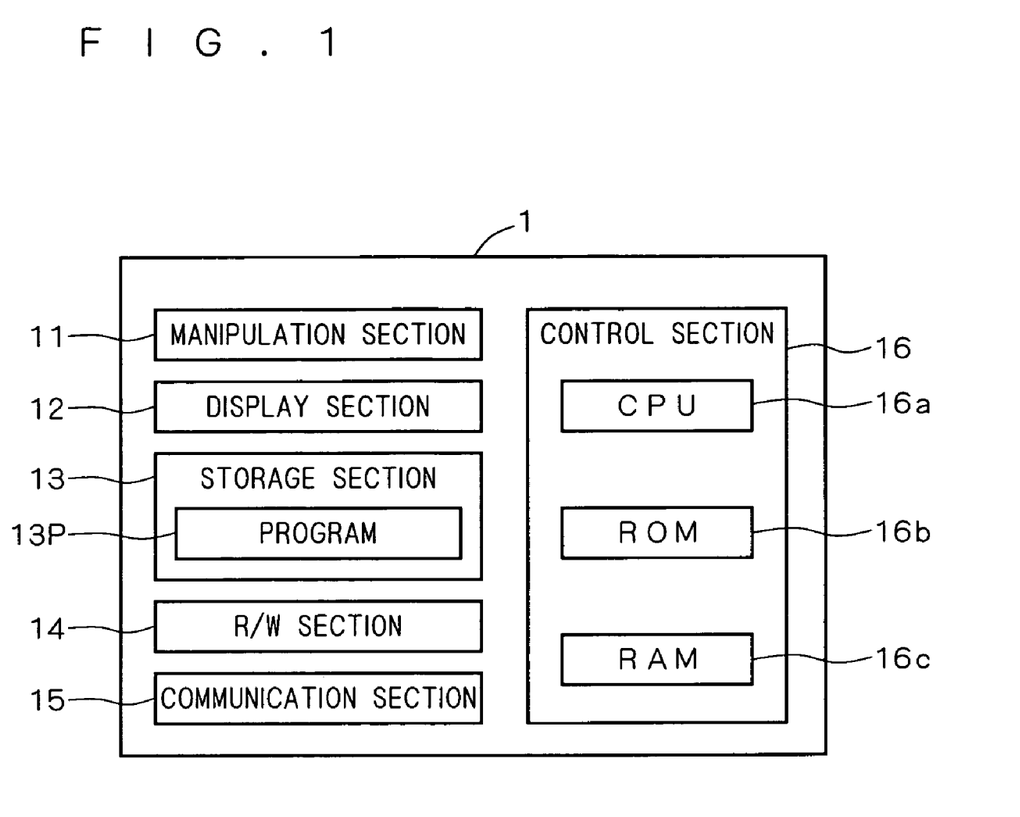
FIG. 1 is a schematic diagram showing the construction of an image data conversion apparatus according to the present invention.

FIG. 1 is a schematic diagram showing the construction of an image data conversion apparatus 1 according to a first preferred embodiment of the present invention. The image data conversion apparatus 1 is an apparatus implemented, for example, by a computer. The image data conversion apparatus 1 executes a predetermined program 13$p$ thereby to convert bitmap-format printing image data (e.g., raster data obtained by a rasterization process) color-designated on a pixel-by-pixel basis for a plurality of color components including a spot color into bitmap-format image data which does not include the spot color.

The image data conversion apparatus 1 can be used in any stage of printing workflow if there arises a need for the above-mentioned image data conversion. It is not necessary that a single computer is configured to have only the function of the image data conversion apparatus 1, but the single computer may be configured to implement a different function by the execution of another program therein. Specifically, the image data conversion apparatus 1 may be used for simulation of the color representation of a printed material to be created, for example, in a layout step or be used for proof output. In the former case, a computer for a layout process may have the function of the image data conversion apparatus 1. In the latter case, a single computer may be configured to be capable of a rasterization process and a screening process.

As shown in FIG. 1, the image data conversion apparatus 1 principally includes: a manipulation section 11 including a mouse and a keyboard for an operator to enter various instructions; a display section 12 including a display device and the like; a storage section 13 constructed by a hard disk and the like and for storing the program 13$p$ for causing the computer to function as the image data conversion apparatus 1, image data to be processed, information (spot color information) required for the pseudocolorization of a spot color, and the like; a R/W section 14 including a media reader/writer for reading/writing data from/to various portable recording media such as a DVD-RAM/RW and a CD-RW; a communication section 15 serving as an interface for transferring data to and from other apparatuses in a network not shown when the image data conversion apparatus 1 is connected to the network; and a control section 16 including a CPU 16$a$, a ROM 16$b$ and a RAM 16$c$ and implementing functions to be described later.

In the image data conversion apparatus 1, a so-called GUI (Graphical User Interface) capable of performing processes while displaying on the display section 12 operator's manipulations through the manipulation section 11 and the processing states of various processes is implemented by the functions of the control section 16, the manipulation section 11 and the display section 12. Processing in sections to be described later which are implemented in the control section 16 is also performed as needed by using the GUI.

Figure 2:
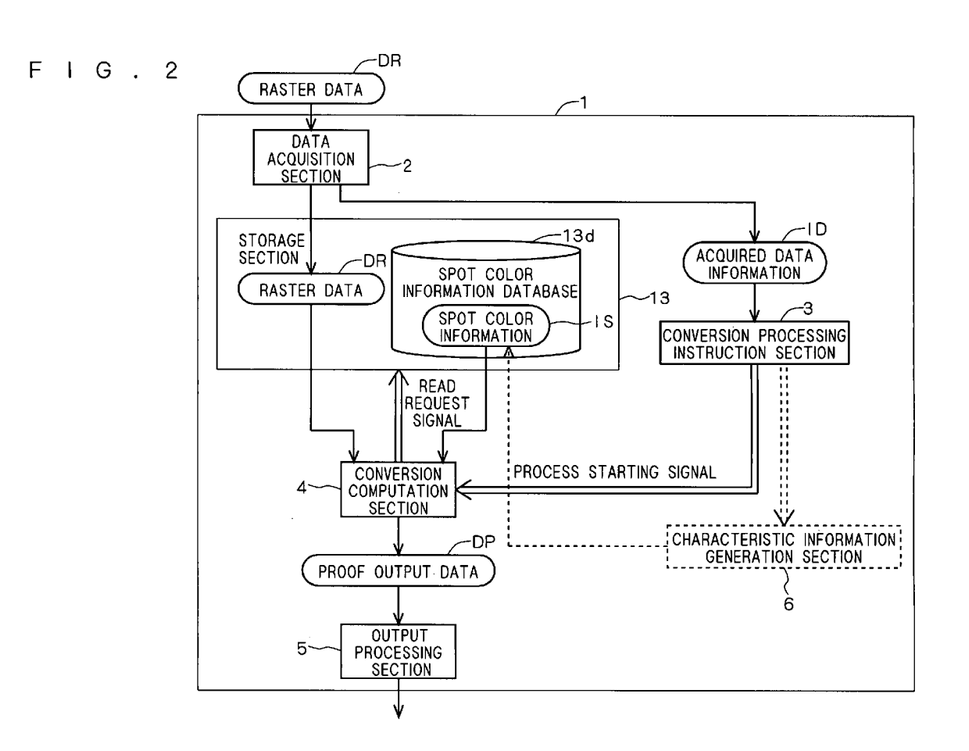
FIG. 2 is a diagram for illustrating functions implemented in a control section of the image data conversion apparatus.

FIG. 2 is a diagram for illustrating functions implemented in the control section 16 of the image data conversion apparatus 1. In the control section 16, the execution of the predetermined program 13$p$ (FIG. 1) stored in the storage section 13 principally causes the implementation of a data acquisition section 2, a conversion processing instruction section 3, a conversion computation section 4 and an output processing section 5 by the action of the CPU 16$a$, the ROM 16$b$ and the RAM 16$c$. A characteristic information generation section 6 may be provided in addition to the sections 2 to 5. These sections will be described below. Data flows during the various processes in the image data conversion apparatus 1 are also shown in FIG. 2, and process flows in the image data conversion apparatus 1 will be also described.

Although not shown in FIG. 1, the storage section 13 includes a spot color information database 13$d$. The spot color information database 13$d$ is a database in which the name of or identification information about a spot color having the possibility of being used in raster data DR and spot color information IS containing a pseudocolor conversion rate (to be described later) are previously stored.

The data acquisition section 2 is responsible for the process of acquiring the raster data DR from the outside of the image data conversion apparatus 1, the raster data DR being bitmap-format image data generated by the execution of a rasterization process on layout data for printing by a predetermined device. The raster data DR is image data to be principally subjected to the conversion process in the image data conversion apparatus 1. The conversion process in the image data conversion apparatus 1 is commenced by the acquisition of the raster data DR.

The acquisition of the raster data DR by the data acquisition section 2 is accomplished by reading the raster data DR from a predetermined portable recording medium by the action of the R/W section 14 when the raster data DR is recorded on the predetermined portable recording medium. The acquisition of the raster data DR is accomplished by gaining access to a predetermined external apparatus through the communication section 15 when the data acquisition section 2 acquires the raster data DR from the predetermined external apparatus via a network.

The data acquisition section 2 references the acquired raster data DR to generate information (acquired data information ID) regarding the structure thereof, and provides the acquired data information ID to the conversion processing instruction section 3. The acquired data information ID contains at least descriptions about the presence or absence of a spot color in the raster data DR and the name of the spot color or identification information determined under a predetermined rule when the spot color is present. The data format of the acquired data information ID is not particularly limited.

The raster data DR acquired by the data acquisition section 2 is stored in the storage section 13 until the conversion process thereof commences. Alternatively, the raster data DR may be temporarily stored in the RAM 16$c$.

The conversion processing instruction section 3 is responsible for the process of instructing the conversion computation section 4 to execute the conversion process of the raster data DR including a spot color. Specifically, the conversion processing instruction section 3 causes the display section 12 to display an execution menu not shown through the GUI for the conversion process of certain raster data DR. Whether to perform the conversion process on the spot color used in the raster data DR or not is selectable from the execution menu. This is achieved by acquiring the name or the like of the spot color described in the acquired data information ID. In response to a predetermined process starting instruction manipulation, e.g. a mouse-click of a predetermined button, by an operator, the conversion processing instruction section 3 provides a process starting signal including information about the raster data DR to be subjected to the conversion process and about the spot color to be subjected to the pseudo-colorization to the conversion computation section 4.

In response to the process starting signal from the conversion processing instruction section 3, the conversion computation section 4 executes a conversion computation process for converting the raster data DR including the spot color into proof output data DP which is raster data not including the spot color. In response to the process starting signal, the conversion computation section 4 provides a read request signal to the storage section 13 to read the target raster data DR from the storage section 13 and to acquire the spot color information IS including the pseudocolor conversion rate of the target spot color from the spot color information database 13*d*, thereby executing the conversion computation process. It is assumed that a computation processing area previously allocated to the RAM 16*c* is used during the conversion computation process.

In the first preferred embodiment, it is assumed that the raster data DR is provided as data including a single spot color as a color component in addition to the process colors so that the conversion computation section 4 generates the proof output data DP by the pseudocolorization of the spot color.

The conversion computation section 4 generates the proof output data DP by performing a conversion computation expressed by $$H_i = P_i + s \cdot G_i - P_i \cdot s \cdot G_i \quad (1)$$

where $P_i$ (e.g., i=C, M, Y or K; the same will apply hereinafter) is the original color density value of a single process color in a given image region (a region which is composed of one or more pixels and in which the same color designation is determined), s is the original color density value of a spot color, $G_i$ is the pseudocolor conversion rate for conversion from the spot color to the process color (in which case, the pseudocolor density value is expressed as, for example, $s \cdot G_c$, $s \cdot G_m$, $s \cdot G_y$, and $s \cdot G_k$ when the process color is C, M, Y and K, respectively), and $H_i$ is the proof color density value obtained by the conversion computation. Each of the color density values equals "0" when no ink is printed, and equals "1" when ink is printed solidly. That is, $0 \leq P_i \leq 1$, $0 \leq s \leq 1$, and $0 \leq H_i \leq 1$. The pseudocolor conversion rate $G_i$ corresponds to a conversion rate for use in converting the original color density value of the spot color into the pseudocolor density value of each process color during the pseudocolorization of the spot color. That is, $s \cdot G_i$ represents the pseudocolor density value of the single process color. Thus, the value $G_i$ is equal to the pseudocolor density value when the spot color is printed solidly. Additionally, $0 \leq G_i \leq 1$.

Thus, the conversion computation section 4 acquires the original color density value $P_i$ of each process color and the original color density value s of the spot color from the raster data DR, and acquires the pseudocolor conversion rate $G_i$ of the spot color from the spot color information IS. Then, the conversion computation section 4 performs the conversion computation expressed by Equation (1) to calculate the proof color density value $H_i$ of each process color on a pixel-by-pixel basis in each image region. A set of such proof color density values corresponds to the proof output data DP. The specific significance of Equation (1) will be described later.

The output processing section 5 is responsible for a process required to transfer the proof output data DP an output apparatus provided outside the image data conversion apparatus 1 in order to subject the proof output data DP to the proof output process.

The characteristic information generation section 6 is responsible for the process of creating new spot color information IS to store the spot color information IS in the spot color information database 13*d* when the spot color information IS about a spot color used in the acquired raster data DR is not stored in the spot color information database 13*d*. The characteristic information generation section 6 is configured to be able to input the value of the pseudocolor conversion rate of the target spot color when the pseudocolor conversion rate of the target spot color is known, e.g. previously announced by the ink manufacturer, and to be able to acquire a color density value obtained by color measurement in a known predetermined color measurement device such as a so-called colorimeter when the pseudocolor conversion rate of the target spot color is unknown.

<Details of Conversion Computation Process>

Next, description will be given on the significance of Equation (1) used in the specific conversion computation process in the image data conversion process (color conversion process) in the first preferred embodiment. The overprinting of a process color and a spot color in the final printing is regarded as the superimposition of halftone dot patterns of the process color and spot color. Therefore, Equation (1) in the first preferred embodiment is derived based on the superimposition of the halftone dot patterns in a manner to be described below.

Figure 3A:
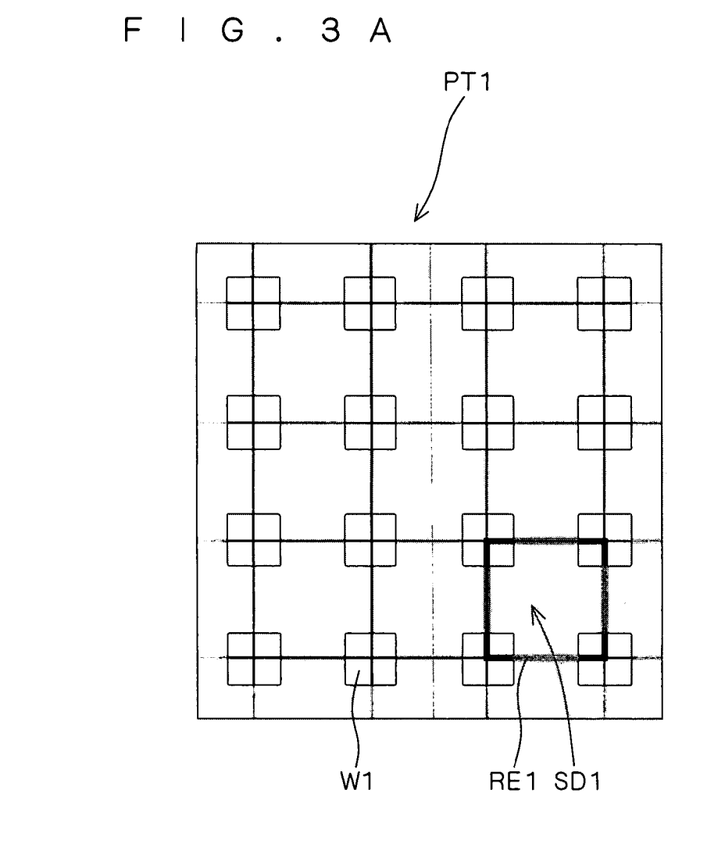
FIG. 3A is a view schematically showing a halftone dot pattern obtained from a process plate for a given process color.

FIG. 3A is a view schematically showing a halftone dot pattern PT1 obtained from a process plate for a given process color (although the actual color component and color density are not necessarily represented due to limitations of illustration; the same is true for the subsequent figures). The halftone dot pattern PT1 is constructed by repeating a unit halftone dot region RE1 surrounded by the thick lines of FIG. 3A. A halftone dot SD1 is formed in each unit halftone dot region RE1. It is assumed that $P_i$ designates the original color density value of the process color as described above. FIG. 3A illustrates an instance where $P_i$=0.82. It is needless to say that the color density value in a halftone dot pattern is equivalent to a dot percentage. Because the color density value is not equal to "1," blank regions W1 on which no ink is printed are present in the halftone dot pattern PT1.

Figure 3B:
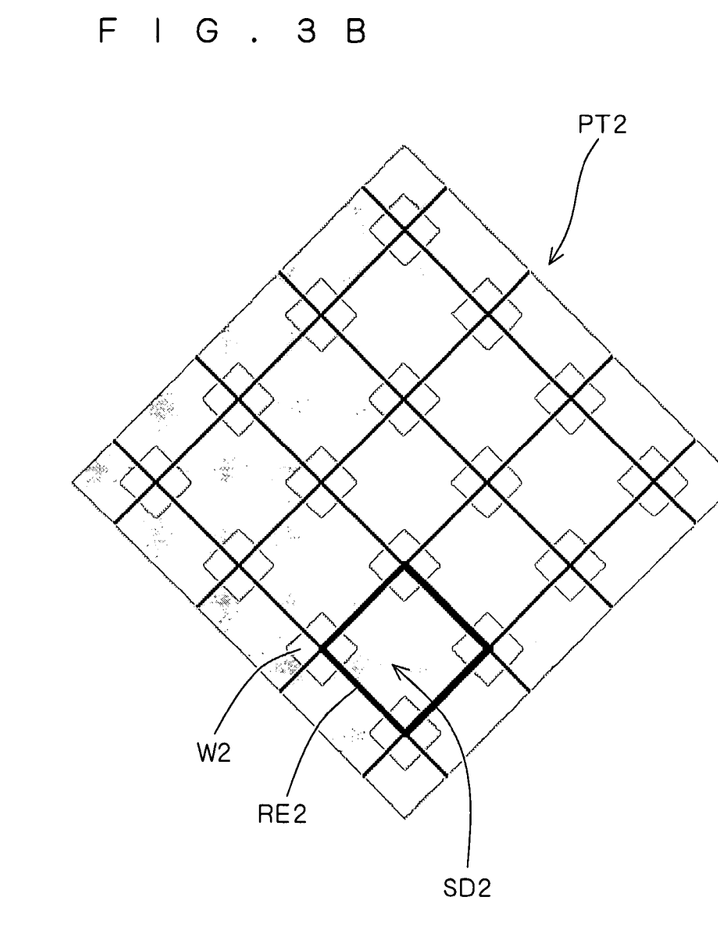
FIG. 3B is a view schematically showing a halftone dot pattern obtained from a spot color plate for a spot color.

FIG. 3B is a view schematically showing a halftone dot pattern PT2 obtained from a spot color plate for a spot color. The halftone dot pattern PT2 is similarly constructed by repeating a unit halftone dot region RE2 surrounded by the thick lines of FIG. 3B. A halftone dot SD2 is formed in each unit halftone dot region RE2. The reference character s designates the original color density value of the spot color as described above. FIG. 3B illustrates an instance where s=0.8. In this case, blank regions W2 are also present in the halftone dot pattern PT2.

Such halftone dot patterns PT1 and PT2 are obtained prior to the final printing by the creation of plates (plate data) after screening based on the raster data by a predetermined screening device. The plate data are provided as binary data indicating whether each recorder grid is ON or OFF. In reality, not only the halftone dot patterns shown in FIGS. 3A and 3B but also halftone dot patterns for all process and spot colors for use in the final printing are provided.

For simplification of illustration and description, it is assumed that the halftone dot pattern PT1 for the process color of FIG. 3A has a screen angle of 0 degree, and the halftone dot pattern PT2 for the spot color has a screen angle of 45 degrees.

Each of the halftone dot patterns represents the color density value with its dot percentage as mentioned above. However, when attention is focused on each recorder grid, the color density value is regarded as being equal to "1" in the ON position because the ink of the corresponding color is printed solidly, and is regarded as being equal to "0" in the other position (or the OFF position). When the colors are overprinted, the recorder grids are classified into four types derived from combinations of the ON and OFF states thereof.

Figure 4:
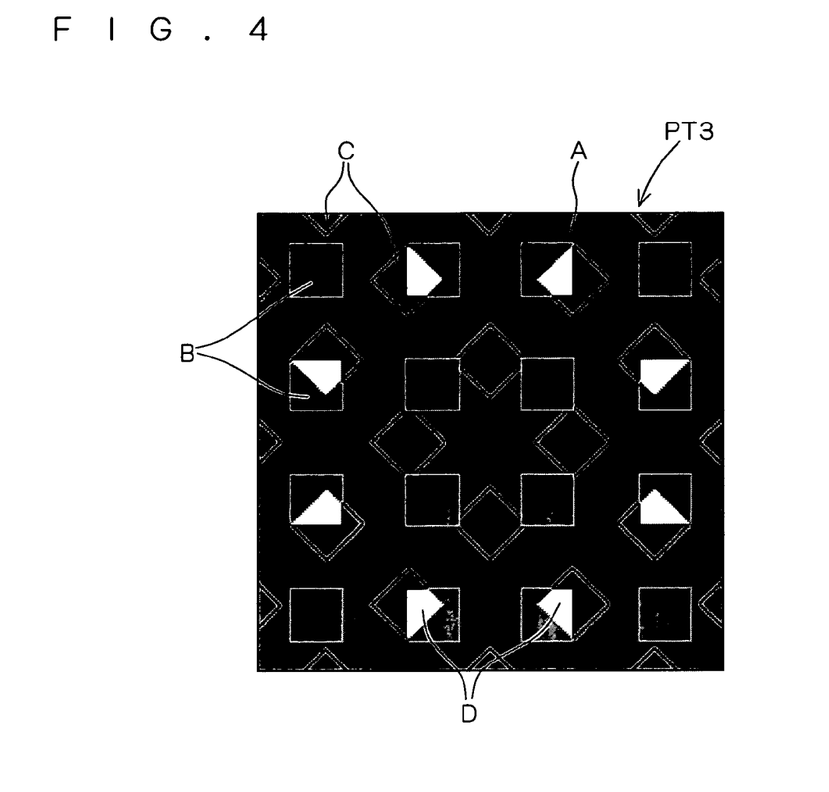
FIG. 4 is a view showing an overprint pattern according to a first preferred embodiment of the present invention.
Figure 5:
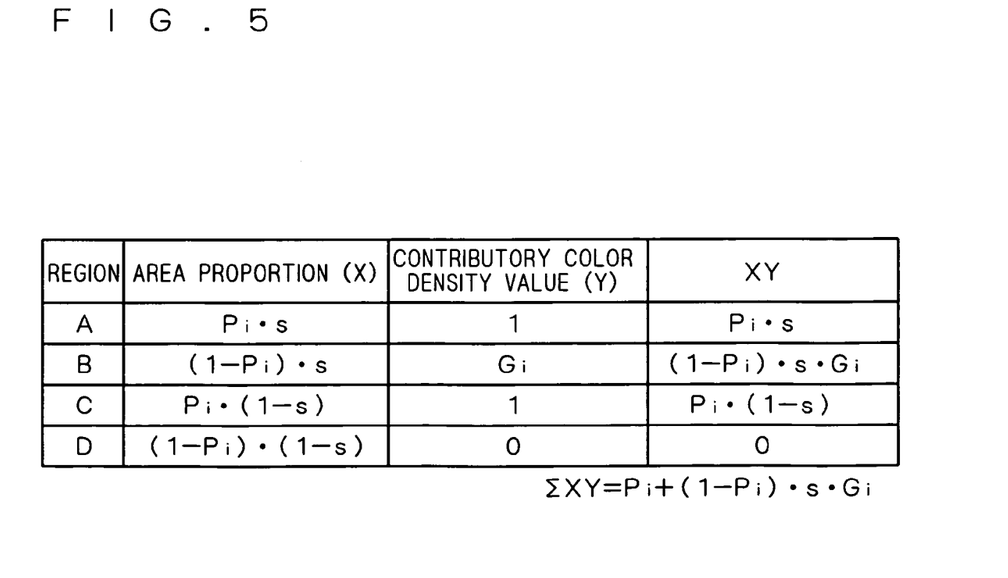
FIG. 5 shows a list of quantities representing the situations of respective regions of the overprint pattern of FIG. 4.

For specific illustration, FIG. 4 is a view showing that the process color and the spot color are overprinted, that is, the two halftone dot patterns PT1 and PT2 are superimposed (to provide an overprint pattern PT3). The overprint pattern PT3 has four regions A to D to be described below in corresponding relation to the above-mentioned four types of the recorder grids. FIG. 5 shows a list of quantities representing the situations of the four regions. One of the quantities listed in FIG. 5 is a quantity (X) indicative of the area proportion of each of the four regions in the overprint pattern PT3.

The region A is a region in which the halftone dots are present in both the halftone dot patterns PT1 and PT2 (ON-state region), that is, in which there will actually arise an overlap of the inks of the process and spot colors. Thus, the area proportion of the region A is given by the product of the proportions of the halftone dots present in the respective halftone dot patterns, that is, the product, $P_i \cdot s$, of the color density values.

The region B is a region in which the blank regions W1 (OFF-state region) are present in the halftone dot pattern PT1 for the process color but the halftone dots SD2 are formed in the halftone dot pattern PT2 for the spot color (ON-state region). That is, only the ink of the spot color is printed in the region B. Thus, the area proportion of the region B is given by the product, $(1-P_i) \cdot s$, of the proportion of the blank regions W1 present in the halftone dot pattern PT1 and the proportion of the halftone dots SD2 present in the halftone dot pattern PT2.

In contrast to the region B, the region C is a region in which the blank regions W2 are present in the halftone dot pattern PT2 for the spot color but the halftone dots SD1 are formed in the halftone dot pattern PT1 for the process color. That is, only the ink of the process color is printed in the region C. Thus, the area proportion of the region C is given by the product, $P_i \cdot (1-s)$, of the proportion of the halftone dots SD1 present in the halftone dot pattern PT1 and the proportion of the blank regions W2 in the halftone dot pattern PT2.

The region D is a region in which the blank regions are present in both the halftone dot patterns PT1 and PT2, that is, a region held blank even when the overprinting is done. Thus, the area proportion of the region D is given by the product, $(1-P_i) \cdot (1-s)$, of the proportions of the blank regions present in the respective halftone dot patterns.

Attention will be focused on each of the recorder grids constituting the halftone dot pattern PT2 during the pseudocolorization of the spot color. For the spot color, a binary value of only either "0" or "1" (i.e., ON or OFF) is initially given as the color density value of each recorder grid. The pseudocolorization causes the pseudocolor conversion rate $G_i$ itself in the ON position to become the color density value of the single process color for the recorder grid. This is because this color density value is calculated as the product of the color density value of "1" obtained when the ink is printed solidly and the pseudocolor conversion rate $G_i$. The binary value remains at "0" in the OFF position. Because $0 \leq G_i \leq 1$, when attention is focused on a given process color, the halftone dot pattern PT2 after the pseudocolorization is formally regarded as a multi-level gradation pattern of the given process color. For the given process color, the overprint after the pseudocolorization may therefore be regarded as the overprint of the same color ink which is produced by the halftone dot pattern PT1 obtained from the original process plate and having a color density value represented by only either "0" or "1" and the halftone dot pattern PT2 obtained from the spot color plate and having a color density value given by $G_i$.

With the foregoing in mind, the color density value of the process color after the pseudocolorization is determined in each of the regions shown in FIG. 4. This color density value is referred to as a contributory color density value (Y) in FIG. 5. The contributory color density values for the respective regions are described below.

In the region A, solid printing is achieved by the ink for the original process plate. Therefore, the contributory color density value in the region A is "1."

In the region B, only the ink for the spot color plate is printed. Therefore, the contributory color density value in the region B is expressed as $G_i$.

In the region C, only the ink for the original process plate is printed. Therefore, the contributory color density value in the region C is "1."

In the region D, there are no inks from the plates. Therefore, the contributory color density value in the region D is "0."

When considered using the overprint pattern PT3 in this manner, the pseudocolorization under conditions where the overprinting occurs can be said to be equivalent to the process of obtaining a multi-level gradation pattern having color density values differing depending on the local regions for each of the process colors.

For the proof output, it is however impractical to determine the color density values by using the recorder grid as the smallest unit in this manner. Also, a proof output apparatus does not always have an output resolution similar to that of the apparatus for the final output. It is therefore practical to average the color density values within an area in which the same color designation is determined, thereby to calculate the color density value after the pseudocolorization, i.e. the proof color density value $H_i$, within the area. Such processing has the advantage that the form of the subsequent proof output is not limited. Specifically, the output may be provided while the multi-level gradation is held as it is by using the proof color density value $H_i$ or be provided after the formation of halftone dots for the proof output (even in a pseudo manner in some cases). The area in which the same color designation is determined is the area to which the area proportion shown in FIG. 5 is applicable.

When considered in this manner, the proof color density value $H_i$ can be calculated by obtaining the sum of the contributory color density values (Y) in the respective regions A to D shown in FIG. 4 which are weighted by the area proportion (X). For a given process color, Equation (1) is derived as $$H_i = P_i \cdot s \cdot 1 + (1-P_i) \cdot s \cdot G_i + (1-s) \cdot P_i \cdot 1 + (1-P_i) \cdot (1-s) \cdot 0$$

$$H_i = P_i \cdot s + (1-P_i) \cdot s \cdot G_i + (1-s) \cdot P_i$$

$$H_i = P_i \cdot s + (1-P_i) \cdot s \cdot G_i + P_i - P_i \cdot s$$

$$\therefore H_i = P_i + s \cdot G_i - P_i \cdot s \cdot G_i$$

where the last equation is Equation (1) indicated again.

Equation (1) indicates that the proof color density value $H_i$ of a given process color is obtained by subtracting the product of the original color density value $P_i$ and the pseudocolor density value $s \cdot G_i$ from the sum of the original color density value $P_i$ and the pseudocolor density value $s \cdot G_i$.

Equation (1) can be transformed into:

$$H_i = P_i + (1-P_i) \cdot s \cdot G_i \quad (2)$$

Equation (2) shows that the first term does not include the values s and $G_i$ which are related to the spot color, but is composed of the original color density value $P_i$ itself which is derived from the original process plate. Therefore, the second term can be said to correspond to the superimposed component of the color density value resulting from the pseudocolorization and overprinting of the spot color.

In other words, to obtain the proof output data using the pseudocolorization, the first preferred embodiment obtains the proof color density value of a given process color by adding to the original color density value a quantity proportional to the color density component $(1-P_i)$ required until the solid printing is achieved beyond the original color density value $P_i$ and proportional to the pseudocolor density value $s \cdot G_i$ of the given process color.

When viewed in a way different from the above, Equation (2) shows that the proof color density value $H_i$ after the pseudocolorization is substantially dependent on the process color when the first term or the original color density value $P_i$ of the process color is large (the second term→0) and that the greater the pseudocolor density value $s \cdot G_i$ is, the greater the proof color density value $H_i$ after the pseudocolorization when the original color density value $P_i$ of the process color is fixed. This means that both a change in gradation of the process color and a change in gradation of the spot color are reflected in the proof color density value $H_i$, and proves that Equation (1) accomplishes the appropriate color conversion.

Equation (1) is also transformed into:

$$H_i = (1 - s \cdot G_i) \cdot P_i + s \cdot G_i \quad (3)$$

In Equation (3), the proof color density value $H_i$ is expressed as a linear function of the original color density value $P_i$ of the process color. The linear function in Equation (3) increases monotonically when the domain is $0 \leq P_i \leq 1$, and the corresponding range is $s \cdot G_i \leq H_i \leq 1$. Also, $H_i = 1$ is satisfied in Equation (3) only when $P_i = 1$ indicating the solid printing of the process color or when $s \cdot G_i = 1$ for the spot color (corresponding to an instance where the spot color plate is actually the process plate). This means that the conversion computation of Equation (1) (or Equation (3)) does not cause a situation in which the saturation of the color density occurs due to the calculated color density value exceeding "1" to result in inaccurate reflection of information about the color component, which arises when the MAX combination method is employed. This also proves that Equation (1) accomplishes the appropriate color conversion.

Because Equation (1) holds independently of the screen angle, Equation (1) is similarly applicable even when a screen angle different from that shown in FIGS. 3A and 3B is given to each halftone dot pattern.

As described hereinabove, the image data conversion apparatus 1 according to the first preferred embodiment performs the conversion process in accordance with Equation (1) (or Equation (2) or (3)) in the conversion computation section 4 to convert the bitmap-format image data (raster data) having a color representation including a spot color into the bitmap-format image data (proof output data) having a color representation not including the spot color and capable of appropriately providing color density values representing the overprinted colors.

Second Preferred Embodiment

The first preferred embodiment illustrates the conversion computation for the pseudocolorization of a single spot color in the case of the overprinting using a spot color plate for the single spot color and a process plate. A second preferred embodiment of the present invention will illustrate a conversion computation for the pseudocolorization of two different spot colors in the case of the overprinting of the two different spot colors. There arises a need for such a conversion computation when producing proof output having an overprint using only the spot colors by means of a proof output apparatus capable of representing only the process colors. In such a case, a conversion computation expression for the color conversion process can be derived by discussion similar to that of the first preferred embodiment. The operations of the sections of the image data conversion apparatus 1 in the second preferred embodiment are basically similar to those in the first preferred embodiment, and will not be described in detail.

Figure 6:
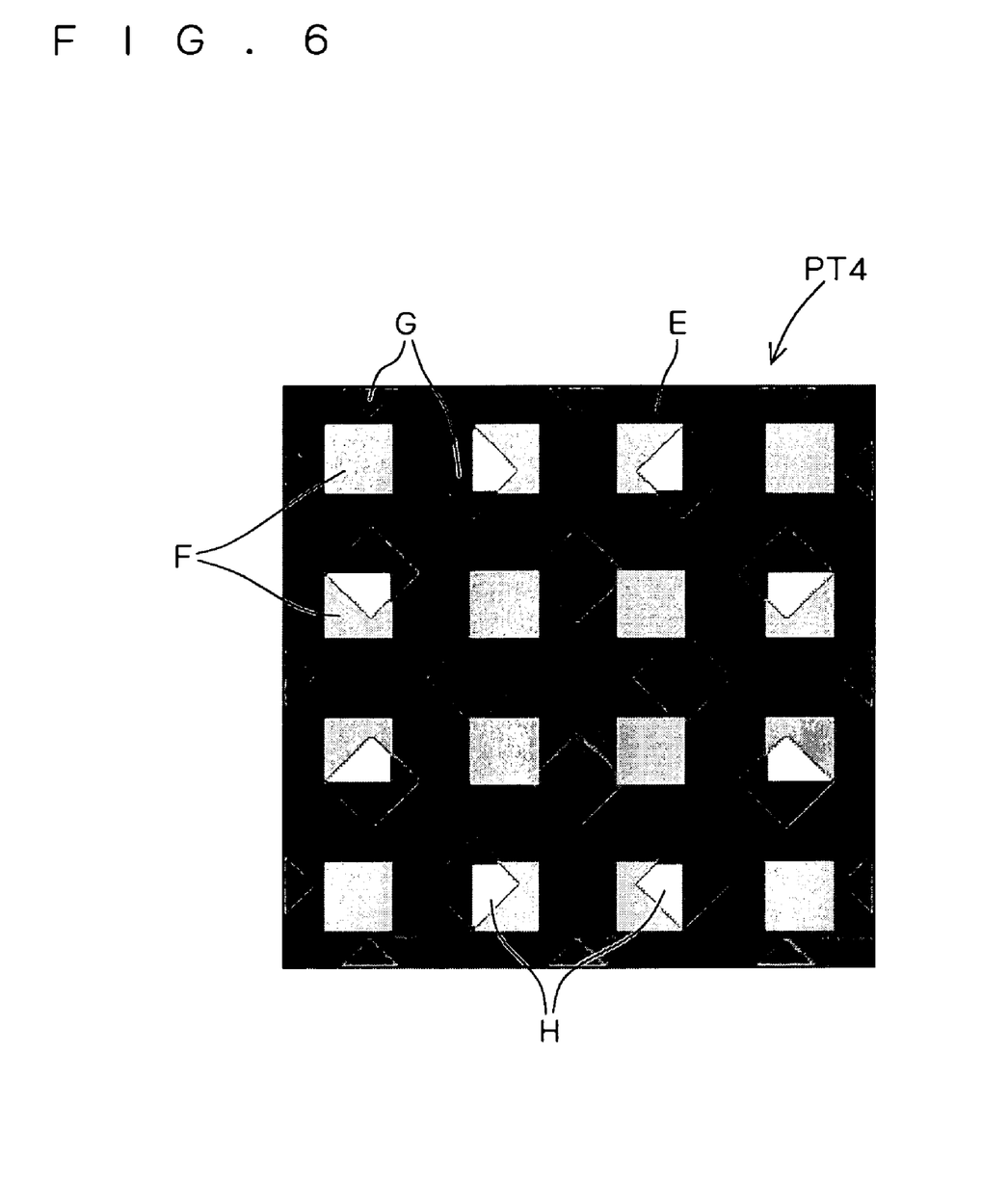
FIG. 6 is a view showing an overprint pattern according to a second preferred embodiment of the present invention.
Figure 7:
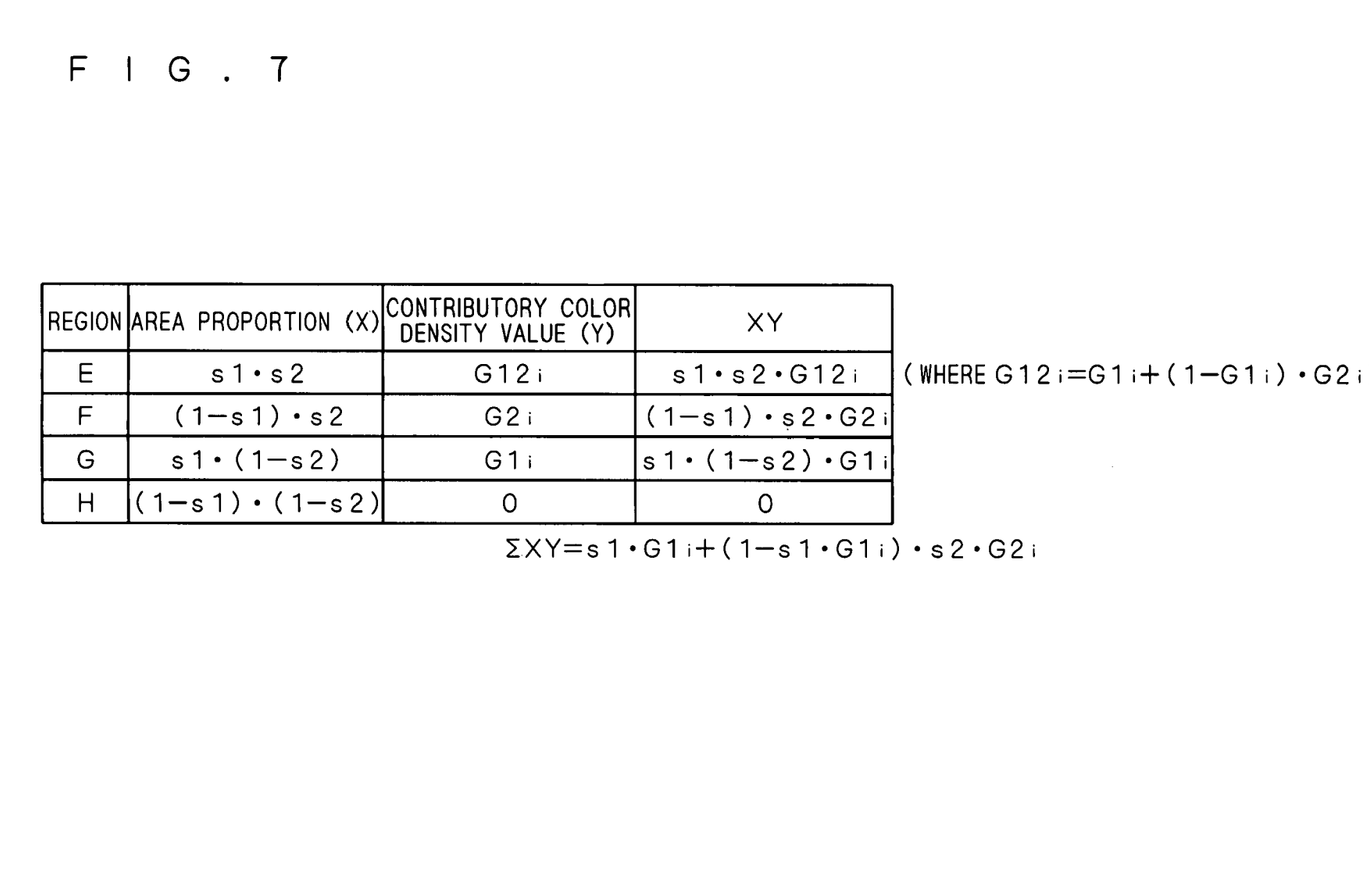
FIG. 7 shows a list of quantities representing the situations of respective regions of the overprint pattern of FIG. 6.

In the above-mentioned case, it is assumed that a halftone dot pattern for a first spot color has a screen angle of 0 degree and a halftone dot pattern for a second spot color has a screen angle of 45 degrees. This provides an overprint pattern PT4 as shown in FIG. 6. Like the overprint pattern PT3 shown in FIG. 4, the overprint pattern PT4 has four regions E, F, G and H to be described below. The contributory color density values in the respective regions for the pseudocolorization are similarly determined by applying the concept of the first preferred embodiment. FIG. 7 shows a list of quantities representing the situations of the four regions E, F, G and H thus obtained. The reference characters s1 and s2 designate the original color density values of the first and second spot colors, respectively, and $G1_i$ and $G2_i$ designate the pseudocolor conversion rates of the first and second spot colors, respectively.

The region E is a region in which there will actually arise an overlap of the inks of the first and second spot colors. Thus, the area proportion of the region E is given by the product of the proportions of the halftone dots present in the respective halftone dot patterns, that is, the product, s1·s2, of the color density values. The reference character $G12_i$ designates a contributory color density value in the region E. The region E may be considered as a region in which ink is solidly printed at a pseudocolor density value obtained by the pseudocolorization of the first spot color and is again solidly printed at a pseudocolor density value obtained by the pseudocolorization of the second spot color. The contributory color density value $G12_i$ can be determined by setting $P_i = G1_i$, $s = 1$ and $G_i = G2_i$ in Equation (1).

$$G12_i = G1_i + 1 \cdot G2_i - G1_i \cdot 1 \cdot G2_i$$

$$\therefore G12_i = G1_i + G2_i - G1_i \cdot G2_i \quad (4)$$

In the region F, only the ink of the second spot color is printed. Thus, the area proportion of the region F is given by $(1-s1) \cdot s2$, and the contributory color density value is given by $G2_i$.

In the region G, only the ink of the first spot color is printed. Thus, the area proportion of the region G is given by $s1 \cdot (1-s2)$, and the contributory color density value is given by $G1_i$.

The region H is a region held blank even when the overprinting is done. Thus, the area proportion of the region H is given by $(1-s1) \cdot (1-s2)$, and the contributory color density value is equal to "0."

Based on these values, the proof color density value $H_i$ of a process color is derived from the contributory color density values weighted by the area proportion as in the first preferred embodiment.

$$H_i = s1 \cdot s2 \cdot (G1_i + G2_i - G1_i \cdot G2_i) + (1-s1) \cdot s2 \cdot G2_i + s1 \cdot (1-s2) \cdot G1_i + (1-s1) \cdot (1-s2) \cdot 0$$

$$H_i = s1 \cdot s2 \cdot G1_i + s1 \cdot s2 \cdot G2_i - s1 \cdot s2 \cdot G1_i \cdot G2_i + s2 \cdot G2_i - s1 \cdot s2 G2_i + s1 \cdot G1_i - s1 \cdot s2 \cdot G1_i$$

$$\therefore H_i = s1 \cdot G1_i + s2 \cdot G2_i - s1 \cdot G1_i \cdot s2 \cdot G2_i \quad (5)$$

Equation (5) indicates that the proof color density value $H_i$ of a given process color is obtained by subtracting the product of the pseudocolor density values $s1 \cdot G1_i$ and $s2 \cdot G2_i$ of the first and second spot colors from the sum thereof.

Thus, the conversion computation section 4 according to the second preferred embodiment acquires the original color density values s1 and s2 of the first and second spot colors from the raster data DR and acquires the pseudocolor conversion rates $G1_i$ and $G2_i$ of the first and second spot colors from the spot color information IS to perform the conversion computation expressed by Equation (5), thereby providing the proof color density value $H_i$ of each process color on a pixel-by-pixel basis in each image region.

Equation (5) can be transformed into:

$$H_i = s1 \cdot G1_i + (1 - s1 \cdot G1_i) s2 \cdot G2_i \quad (6)$$

In Equation (6), it may be said that the first term indicates the contribution of the first spot color and the second term indicates the contribution of the second spot color. Therefore, Equation (6) shows that both changes in gradation of the respective spot colors are obviously reflected in the proof color density value $H_i$.

Equation (5) is also transformed into:

$$H_i = (1 - s2 \cdot G2_i) s1 \cdot G1_i + s2 \cdot G2_i \quad (7)$$

It may be said that Equation (7) is a monotonically increasing linear function of $s1 \cdot G1_i$. Therefore, the proof color density value $H_i$ given by Equation (7) is not saturated as discussed in relation to Equation (3).

The image data conversion apparatus 1 according to the second preferred embodiment also performs the conversion process in accordance with Equation (5) (or Equation (6) or (7)) in the conversion computation section 4 to convert the bitmap-format image data (raster data) having a color representation including two spot colors into the bitmap-format image data (proof output data) having a color representation which does not include the spot colors but includes only the process colors and capable of appropriately providing color density values representing the overprinted colors.

Equation (5) coincides with Equation (1) when s1, $G1_i$, s2 and $G2_i$ in Equation (5) are replaced with $P_i$, 1, s and $G_i$, respectively. This is the case where the first spot color is actually a process color itself. When a component of the pseudocolor conversion rate $G_i$ for conversion from a given spot color to one of the process colors is set at "1" whereas components thereof for conversion from the given spot color to the remaining process colors are set at "0," the given spot color coincides with the one process color. In consideration for this, Equation (5) may be regarded as the general expression of Equation (1).

<Modifications>

The above-mentioned preferred embodiments are described, based on the assumption that the process colors are principally the four CMYK colors. However, Equations (1) and (5) described above hold equivalently for each color component independently of the number of process colors. Thus, whether the number of process colors is greater or smaller is not significant. It is hence needless to say that the above-mentioned equations similarly hold when more than four process colors are used for the pseudocolorization. For example, the present invention is applicable when six colors are used as the process colors.

The pseudocolorization of three or more spot colors is similarly processed by repeating the conversion computation process described in the above-mentioned preferred embodiments.

EXAMPLES

Inventive Example

Figure 8A:
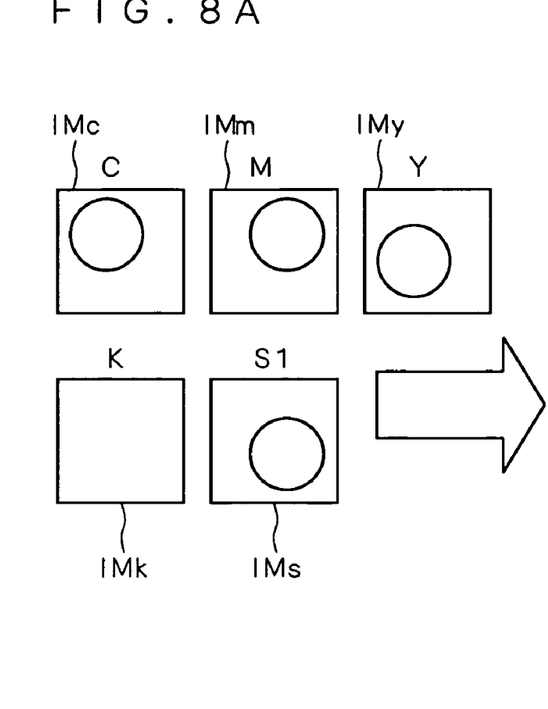
FIGS. 8A and 8B show overprinting in an inventive example of the present invention.
Figure 8B:
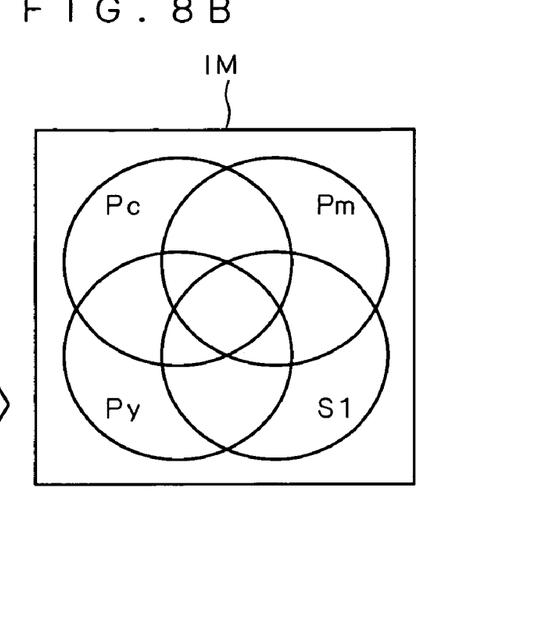
Figure 9:
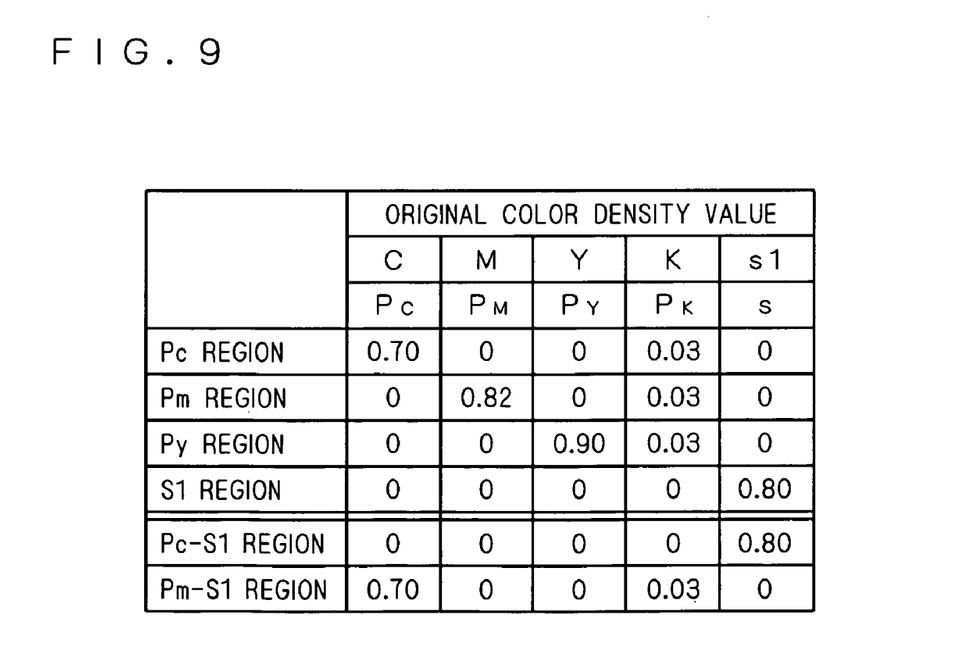
FIG. 9 shows a list of color designations in the inventive example.

The color conversion according to the first preferred embodiment will be described in detail, using the overprinting shown in FIGS. 8A and 8B as an example. FIG. 8A shows separation images IMc, IMm, IMy, IMk and IMs to be formed by the four process plates for cyan (C), magenta (M), yellow (Y) and black (K), and a spot color plate for a spot color S1, respectively. FIG. 8B shows a print image IM obtained by overprinting these colors. It is assumed that predetermined color density values for all of the colors but black are set in respective circular regions (a Pc region, a Pm region, a Py region and an S1 region) shown in FIG. 8A. It is also assumed that a color density value for black is set in other than the S1 region. FIG. 9 shows a list of color designations in this case. The color density values designated in FIG. 9 correspond to the original color density values. Specifically, $P_C = 0.7$, $P_M = 0.82$, $P_Y = 0.9$, $P_K = 0.03$, and $s = 0.8$.

In FIG. 9, a Pc-S1 region indicates a region in which an image of cyan overlaps an image of the spot color S1, and a Pm-S1 region indicates a region in which an image of magenta overlaps the image of the spot color S1. These two regions are those in which the color representation should be noted when the spot color S1 is subjected to the pseudocolorization for the proof color density value.

Figure 10:
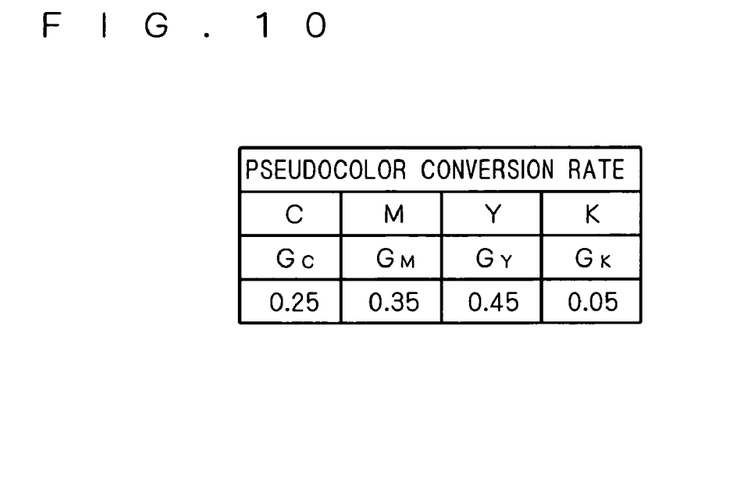
FIG. 10 shows a list of pseudocolor conversion rates for a spot color in the inventive example.
Figure 11:
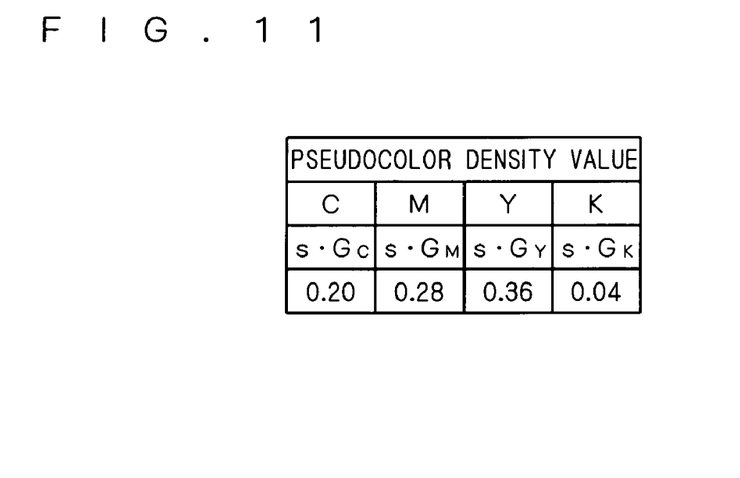
FIG. 11 shows a list of pseudocolor density values in the inventive example.

FIG. 10 shows a list of pseudocolor conversion rates for conversion from the spot color S1 to the process colors which are determined as the spot color information IS. FIG. 11 shows a list of pseudocolor density values of the respective process colors which are determined from the pseudocolor conversion rates and the original color density value of the spot color S1.

Figure 12:
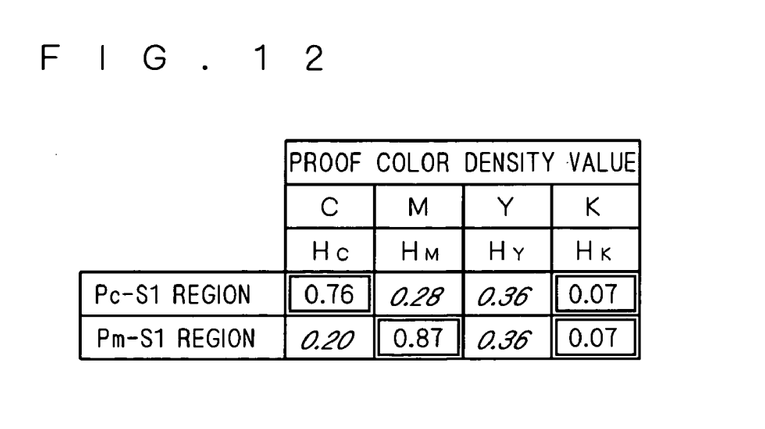
FIG. 12 shows a list of proof color density values in the inventive example.

FIG. 12 shows a list of proof color density values in the Pc-S1 region and the Pm-S1 region which are calculated based on Equation (1) using the original color density values shown in FIG. 9 and the pseudocolor conversion rates shown in FIG. 10. A comparison between FIGS. 12 and 9 shows that the pseudocolor density value shown in FIG. 11 is given as the proof color density value (as indicated in italic) for a color component having the original color density values of "0" in both of the regions prior to the pseudocolorization. This is similar to a situation in which the overprinting is not substantially done because an image of the process color is not formed in each of the regions for the above-mentioned color component.

On the other hand, color components having an original color density value not equal to "0" prior to the pseudocolorization are as follows: the proof color density value of cyan in the Pc-S1 region presents an increase of only 0.07 from the original color density value, and the proof color density value of magenta in the Pm-S1 region similarly presents an increase of only 0.05 from the original color density value (as surrounded by double lines). The increase in color density value as compared with the value of only the process color can be said to indicate that a change in color density resulting from the overprinting of the spot color is reflected. Because the pseudocolor density value is small relative to the original color density value, the fact that the increment is less than the pseudocolor density value means that the contribution of the spot color to the overprinting is small relative to the contribution of the process color (cyan in the Pc-S1 region, and magenta in the Pm-S1 region). On the other hand, the proof color density value of black is approximately equal to the simple sum of the original color density value and the pseudocolor density value (the precise proof color density value is equal to 0.0698). This indicates that when the original color density value and the pseudocolor density value are both small, the proof color density value obtained according to the present invention is approximately equal to that obtained by the use of the simple sum of the original color density value and the pseudocolor density value. This is equivalent to the fact that the value inside the parentheses in the second term of Equation (2) is approximately equal to "1".

Comparative Example 1

Figure 13:
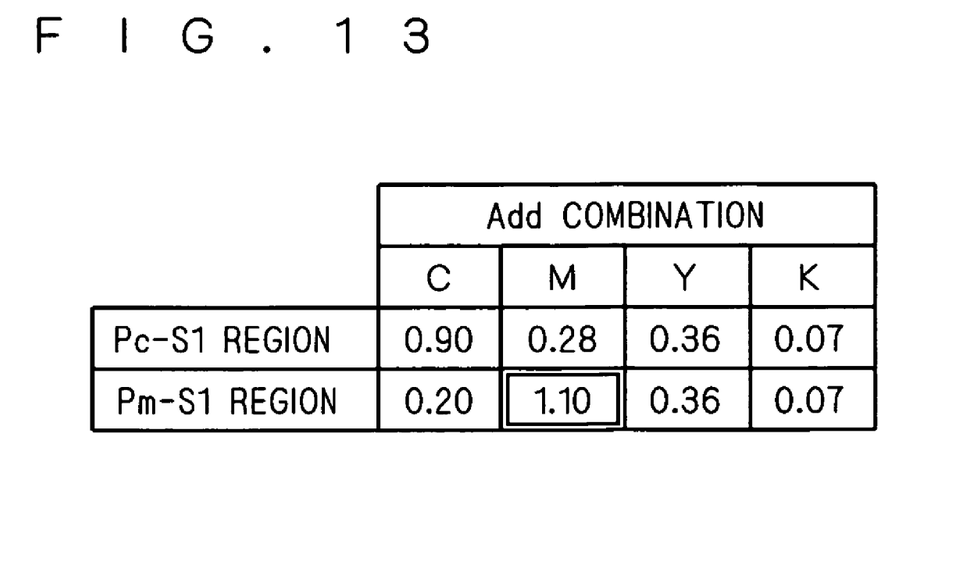
FIG. 13 shows a list of results of Add combination in a comparative example.

FIG. 13 shows a list of color components in the Pc-S1 region and the Pm-S1 region which are obtained if the Add combination method is used in the instance of FIG. 9. Specifically, each of the color components shown in FIG. 13 is provided as the simple sum of the original color density value in a corresponding region provided in FIG. 9 and the pseudocolor density value provided in FIG. 11. In this case, the color density value of magenta in the Pm-S1 region exceeds "1" (as surrounded by the double lines). Thus, the Add combination method causes a situation in which the gradation represented by an amount exceeding "1" is neglected in the Pm-S1 region.

Inventive Example described above does not cause such a situation. Therefore, the conversion process according to the first preferred embodiment may be said to be superior to the Add combination method as a method of providing the color density values representing the overprinted colors after the pseudocolorization.

Comparative Example 2

Figure 14:
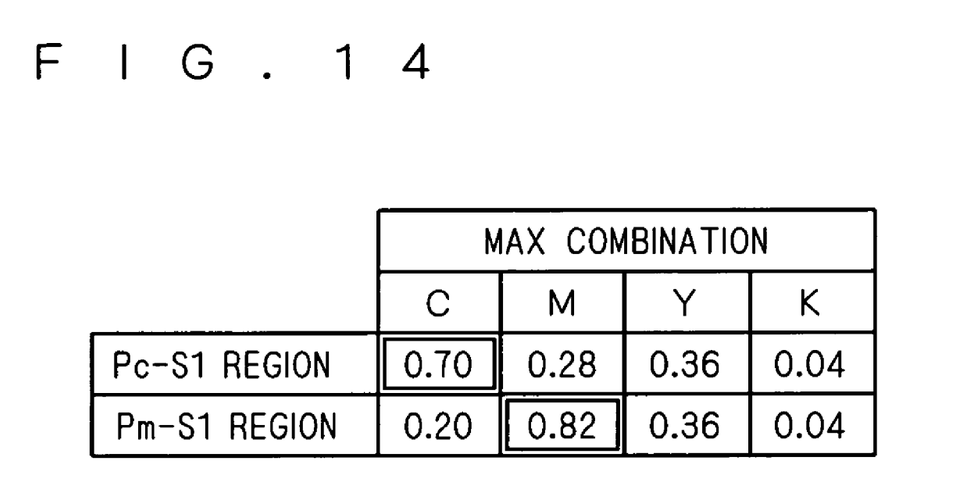
FIG. 14 shows a list of results of MAX combination in another comparative example.

FIG. 14 shows a list of color components in the Pc-S1 region and the Pm-S1 region which are obtained if the MAX combination method is used in the instance of FIG. 9. Specifically, each of the color components shown in FIG. 14 is the greater one of the following two values: the original color density value in a corresponding region provided in FIG. 9 and the pseudocolor density value provided in FIG. 11. In this case, the color density value of cyan in the Pc-S1 region and the color density value of magenta in the Pm-S1 region are equal to the original color density values (both as surrounded by the double lines). Thus, the MAX combination method causes a situation in which the increase in the color density value which should result from the overprinting is neglected.

Inventive Example described above does not cause such a situation. Therefore, the conversion process according to the first preferred embodiment may be said to be superior to the MAX combination method as a method of providing the color density values representing the overprinted colors after the pseudocolorization.

While the invention has been described in detail, the foregoing description is in all aspects illustrative and not restrictive. It is understood that numerous other modifications and variations can be devised without departing from the scope of the invention.

What is claimed is:

1. A method of converting first image data into second image data by using a predetermined conversion element provided in a predetermined image data processing apparatus, said first image data having a plurality of first color components, said plurality of first color components being a spot color and at least one process color, said second image data having a plurality of second color components, each of said plurality of second color components being a process color, said method comprising the steps of:

a) acquiring a plurality of first color density values for said plurality of first color components from said first image data;

b) reading conversion information from a predetermined storage element, said conversion information including a plurality of conversion factors for obtaining a pseudocolor density value for said spot color; and c) converting said first image data into said second image data, the conversion in said step c) being performed by calculating a plurality of second color density values for said plurality of second color components based on said plurality of first color density values and said plurality of conversion factors, wherein a second color density value $H_i$ for a given color component i included among said plurality of second color density values is calculated by $$H_i = P_i + s \cdot G_i - P_i \cdot s \cdot G_i$$

where said given color component i is one of said plurality of second color components, $P_i$ is a first color density value for said given color component i included among said plurality of first color density values, $G_i$ is a conversion factor for said given color component i included among said plurality of conversion factors, s is a first color density value for said spot color included among said plurality of first color density values, and each of the color density values is defined that a maximum value is "1".

2. An image data conversion apparatus for converting first image data into second image data, said first image data having a plurality of first color components, said plurality of first color components being a spot color and at least one process color, said second image data having a plurality of second color components, each of said plurality of second color components being a process color, said image data conversion apparatus comprising:

an acquisition element for acquiring a plurality of first color density values for said plurality of first color components from said first image data;

a storage element for storing conversion information including a plurality of conversion factors for obtaining a pseudocolor density value for said spot color;

a reading element for reading said conversion information from said storage element; and a conversion element for converting said first image data into said second image data, the conversion by said conversion element being performed by calculating a plurality of second color density values for said plurality of second color components based on said plurality of first color density values and said plurality of conversion factors, wherein a second color density value $H_i$ for a given color component i included among said plurality of second color density values is calculated by $$H_i = P_i + s \cdot G_i - P_i \cdot s \cdot G_i$$

where said given color component i is one of said plurality of second color components, $P_i$ is a first color density value for said given color component i included among said plurality of first color density values, $G_i$ is a conversion factor for said given color component i included among said plurality of conversion factors, s is a first color density value for said spot color included among said plurality of first color density values, and each of the color density values is defined that a maximum value is "1".

3. A computer-readable recording medium, storing a program which is executed in a computer thereby to cause said computer to function as a conversion element for a data processing apparatus, said conversion element executing a method of converting first image data into second image data, said first image data having a plurality of first color components, said plurality of first color components being a spot color and at least one process color, said second image data having a plurality of second color components, each of said plurality of second color components being a process color, said method comprising the steps of:

a) acquiring a plurality of first color density values for said plurality of first color components from said first image data;

b) reading conversion information from a predetermined storage element, said conversion information including a plurality of conversion factors for obtaining a pseudocolor density value for said spot color; and     c) converting said first image data into said second image data,     the conversion in said step c) being performed by calculating a plurality of second color density values for said plurality of second color components based on said plurality of first color density values and said plurality of conversion factors,     wherein a second color density value $H_i$ for a given color component i included among said plurality of second color density values is calculated by $$H_i = P_i + s \cdot G_i - P_i \cdot s \cdot G_i$$

where said given color component i is one of said plurality of second color components, $P_i$ is a first color density value for said given color component i included among said plurality of first color density values, $G_i$ is a conversion factor for said given color component i included among said plurality of conversion factors, s is a first color density value for said spot color included among said plurality of first color density values, and each of the color density values is defined that a maximum value is "1".

4. A computer-readable recording medium, storing a program which is executed in a computer thereby to cause said computer to function as a data conversion apparatus for converting first image data into second image data, said first image data having a plurality of first color components, said plurality of first color components being a spot color and at least one process color, said second image data having a plurality of second color components, each of said plurality of second color components being a process color, said data conversion apparatus comprising:

an acquisition element for acquiring a plurality of first color density values for said plurality of first color components from said first image data;

a storage element for storing conversion information including a plurality of conversion factors for obtaining a pseudocolor density value for said spot color;

a reading element for reading said conversion information from said storage element; and     a conversion element for converting said first image data into said second image data,     the conversion by said conversion element being performed by calculating a plurality of second color density values for said plurality of second color components based on said plurality of first color density values and said plurality of conversion factors,     wherein a second color density value $H_i$ for a given color component i included among said plurality of second color density values is calculated by $$H_i = P_i + s \cdot G_i - P_i \cdot s \cdot G_i$$

where said given color component i is one of said plurality of second color components, $P_i$ is a first color density value for said given color component i included among said plurality of first color density values, $G_i$ is a conversion factor for said given color component i included among said plurality of conversion factors, s is a first color density value for said spot color included among said plurality of first color density values, and each of the color density values is defined that a maximum value is "1".

* * * * *